July 19, 1955  J. R. HOFFMAN  2,713,621
SIGNAL DEVICE FOR HAY BALERS
Filed June 8, 1953

James R. Hoffman
INVENTOR.

BY *Clarence A. O'Brien*
*and Harvey B. Jacobson*
Attorneys

July 19, 1955
J. R. HOFFMAN
2,713,621
SIGNAL DEVICE FOR HAY BALERS
Filed June 8, 1953
2 Sheets-Sheet 2
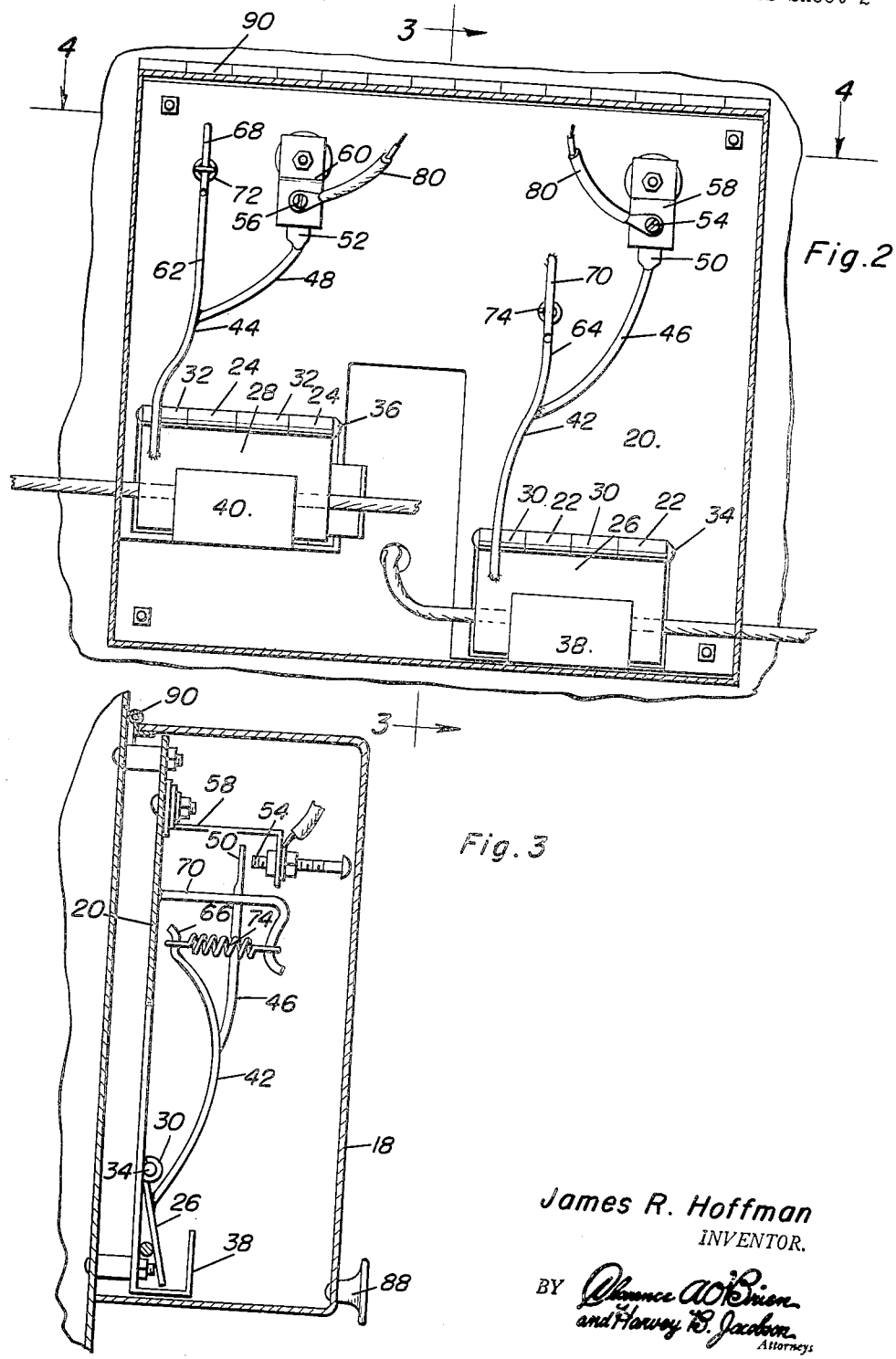
James R. Hoffman
INVENTOR.
BY *O'Brien and Harvey B. Jacobson*
Attorneys

United States Patent Office 2,713,621
Patented July 19, 1955

2,713,621

SIGNAL DEVICE FOR HAY BALERS

James R. Hoffman, Wooster, Ohio

Application June 8, 1953, Serial No. 360,238

2 Claims. (Cl. 200—61.18)

This invention relates to an attachment for hay balers and like agricultural machinery, and more particularly to a device adapted to provide a signal to an operator when the supply of twine in the twine container has become exhausted.

The primary object of this invention resides in the provision of a device which is adapted to be secured on the conventional container for twine as is used on a conventional hay baler so as to be continually in a position to provide a signal that the twine has been exhausted.

The construction of this invention features a casing having a base plate with hinge plates attached thereto. The twine is received between the hinge plate and base plate and holds each hinge plate in a predetermined position. This position is such as to prevent a contact arm mounted on the hinge plate from engaging a contact member also mounted in the casing. However, when the twine has been exhausted, the hinge plate will be released, thus permitting the contact arm to engage the contact member.

Still further objects and features of this invention reside in the provision of a signal device for hay balers and the like that is strong and durable, simple in construction and manufacture, capable of being readily and easily installed on various existing makes and models of like agricultural equipment, and which is relatively inexpensive to produce.

These, together with the various ancillary objects and features of the invention which will become apparent as the following description proceeds, are attained by this signal device for hay balers, a preferred embodiment of which has been illustrated in the accompanying drawings by way of example only, wherein:

Figure 2 is a horizontal sectional view as taken along the plane of line 2—2 in Figure 1;

Figure 3 is a vertical sectional view as taken along the plane of line 3—3 in Figure 2;

Figure 1:
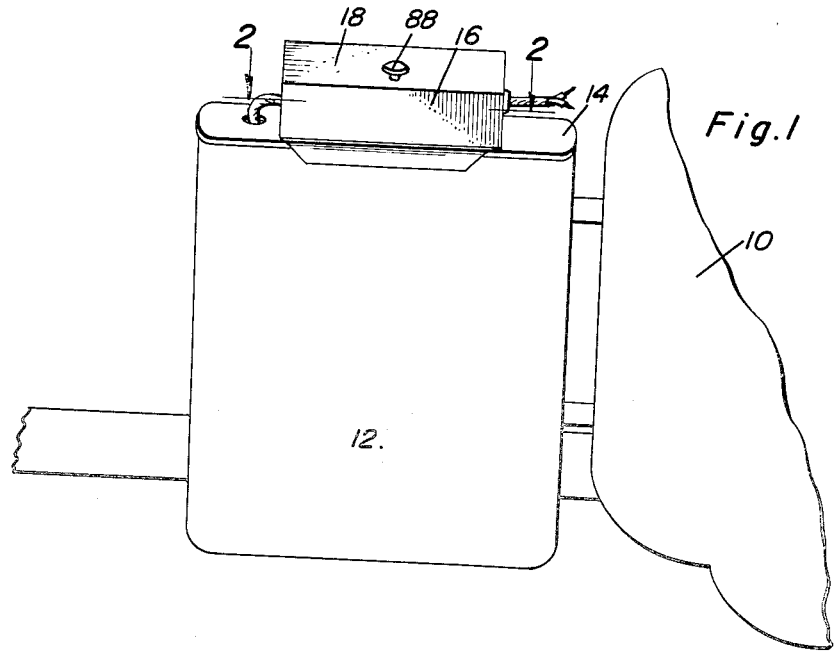
Figure 1 is a perspective view showing the device as operatively installed on a hay baler.
Figure 4:
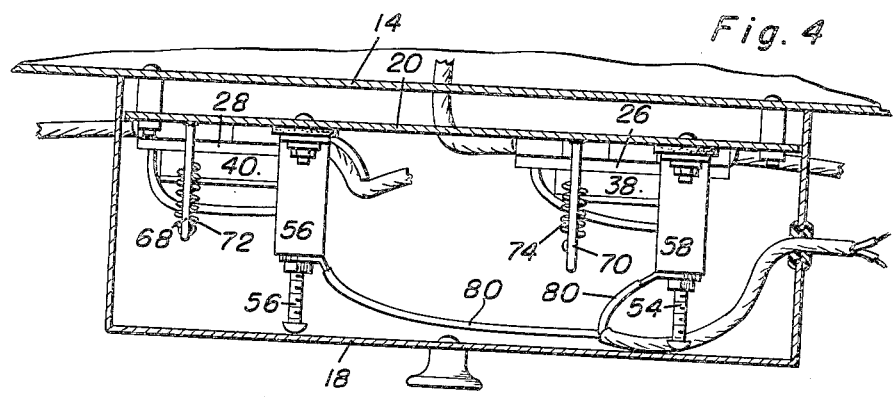
Figure 4 is a vertical sectional view taken along the plane of line 4—4 in Figure 2.
Figure 5:
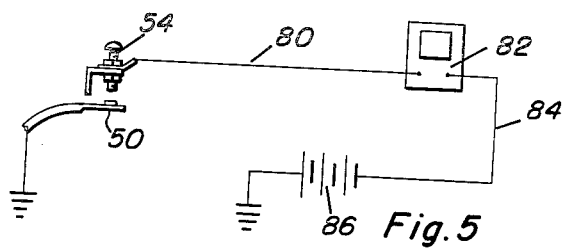
Figure 5 is a wired diagram of the electrical circuit used in this present invention.

With continued reference to the accompanying drawings, wherein like reference numerals designate similar parts throughout the various views, the reference numeral 10 generally designates a conventional hay baler or like item of agricultural equipment which is provided with a container 12 for twine used in tying bales of hay and the like together. Two strands of twine pass through the top 14 of the twine container 12 and, in accordance with the concepts of the present invention, pass into a casing 16 having a hinged lid 18.

The casing 16 which forms part of the present invention is secured to the top 14 of the container 12 and has attached therein a base plate 20. Hingedly secured to the base plate 20 by means of knuckles 22 and knuckles 24 are a pair of hinged plates 26 and 28 which are also provided with knuckles 30 and 32. Pintles 34 and 36 are provided to insure freely moving pivotal action of the hinged plates 26 and 28 relative to the base plate 20. Extending upwardly from the base plate are substantially L-shaped overlying plates 38 and 40 which are adapted to prevent the hinged plates from rotating past a predetermined limit, therefore preventing the ends of the twine received between the base plate 20 and the hinged plates 26 and 28 from escaping from their inserted position.

The hinged plates 26 and 28 each carries a contact arm as at 42 and 44, respectively. The contact arms 42 and 44 are provided with limbs 46 and 48 carrying contacts 50 and 52 adapted to engage adjustable contacts 54 and 56 comprising threaded members carried by substantially S-shaped brackets 58 and 60 which in turn are secured to the base plate 20. The contact arms 42 and 44 have other upwardly extending limbs 62 and 64 which terminate in arcuate end portions as at 66. Secured to the base plate 20 are a pair of spring support rods 68 and 70. Terminally secured to the spring support rods 68 and 70 and to the limbs 62 and 64 are coil springs 72 and 74. The springs 72 and 74 tend to continuously urge the hinged plates 26 and 28 against the base plate 20. Hence, with the twine positioned between the hinged plates 26 and 28 and the base plate 20, it is impossible for the contacts 50 and 52 to engage the contact members 54 and 56. However, with the twine removed, the springs 72 and 74 will urge the contacts 50 and 52 into engagement with the contact members 54 and 56.

Connected to the contact members 54 and 56 in parallel circuits are conductors 80 which are connected to a horn 82, or other suitable alarm device, which is connected by suitable conductors 84 to a grounded battery 86 or other suitable source of electrical current mounted on the vehicle propelling the hay baler or other item of agricultural machinery. Of course the contacts 50 and 52 are grounded. In this manner, when twine is not present between the base plate 20 and the hinged plates 26 and 28, the horn 82 will be actuated, thus providing an audible alarm whereby the operator will be informed that he must now refill the twine container 12. As can be readily understood, many times a hay baler continues in operation long after the twine has been exhausted, therefore effectively losing for the operator thereof a considerable period of his labor. It is to be noted that the threaded contact members 54 and 56 are adjustable in order that various sizes and types of twine and other tie means can be used. When it is desired to refill the container 12, the top 14 may be readily lifted therefrom. It is to be noted that the lid 18 of the casing 16 may be readily raised using a knob 88 provided for that purpose. The lid 18 is of course hinged as at 90 to the casing.

From the foregoing, the construction and operation of this signal for hay balers will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is:

1. A signal actuating device for balers for exciting a signal device to provide a warning of exhaustion of twine comprising a casing adapted to be positioned on the container of twine, said casing having a base plate, a hinge plate hingedly secured to said base plate, a contact arm carried by said hinge plate, a contact member positioned in said casing, and means continuously urging said contact arm to engage said contact member, the twine passing between said hinge plate and said base plate holding said hinge plate against pivotal movement thus holding said contact arm out of engagement with said contact member, said means comprising a spring support rod secured to said base plate, said contact arm having a pair of divergently extending limbs, and a spring terminally secured to said spring support rod and one of said limbs.

2. A signal actuating device for balers for exciting a signal device to provide a warning of exhaustion of each strand of twine of a pair of strands of twine comprising a casing adapted to be positioned on a container of twine, said casing having a base plate, a pair of hinge plates hingedly secured to said base plate, contact arms carried by said hinge plates, contact members positioned in said casing, and means continuously urging said contact arms to engage said contact members, the twine passing between said hinge plates and said base plate holding said hinge plates against pivotal movement thus holding said contact arms out of engagement with said contact members, said means comprising spring support rods secured to said base plate, said contact arms having pairs of divergently extending limbs, and springs terminally secured to said spring support rods and one of each pair of limbs, said hinge plates being spaced from and horizontally offset from each other to permit free movement of said twine, and substantially L-shaped plates overlying said hinge plates to limit rotational movement of said hinge plates.

References Cited in the file of this patent
UNITED STATES PATENTS

| | | |
|---|---|---|
| 2,252,853 | Hoover | Aug. 19, 1941 |
| 2,640,893 | Stalzer | June 2, 1953 |